United States Patent
Ishida

(10) Patent No.: US 8,308,400 B2
(45) Date of Patent: Nov. 13, 2012

(54) SHEET MEMBER, ROTARY TOOL USING THE SHEET MEMBER, AND CUTTING METHOD USING THE ROTARY TOOL

(75) Inventor: Takuya Ishida, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 515 days.

(21) Appl. No.: 12/594,162

(22) PCT Filed: Mar. 28, 2008

(86) PCT No.: PCT/JP2008/056118
§ 371 (c)(1),
(2), (4) Date: Sep. 30, 2009

(87) PCT Pub. No.: WO2008/123424
PCT Pub. Date: Oct. 16, 2008

(65) Prior Publication Data
US 2010/0111620 A1  May 6, 2010

(30) Foreign Application Priority Data

Mar. 30, 2007 (JP) ................................ 2007-092138

(51) Int. Cl.
*B23B 27/00* (2006.01)
*B23B 29/00* (2006.01)
(52) U.S. Cl. .......................................... 407/46; 407/40
(58) Field of Classification Search ............ 407/40, 407/46, 47, 67, 73, 101
See application file for complete search history.

(56) References Cited

U.S. PATENT DOCUMENTS 4,393,735 A * 7/1983 Eckle et al. ............... 82/158
5,129,767 A * 7/1992 Satran et al. .............. 407/40
(Continued)

FOREIGN PATENT DOCUMENTS

JP    54-174083    12/1979
(Continued)

OTHER PUBLICATIONS

German language office action and its English language translation for corresponding German application 112008000835.3.

*Primary Examiner* — Will Fridie, Jr.
(74) *Attorney, Agent, or Firm* — DLA Piper LLP (US)

(57) ABSTRACT

A sheet member has a body part having a top surface, a bottom surface and a side surface; and an upper shoulder part which is formed so as to project from the top surface of the body part, and has an upper shoulder top surface and an upper shoulder side surface. The upper shoulder part has a restricting seat surface formed on the top surface and abutted against the bottom surface of a cutting insert; a first through hole extending between the restricting seat surface and the bottom surface or the side surface; and a screw hole opening into the restricting seat surface. The body part has a first restricting side surface which is formed on the upper shoulder side surface intersected with the restricting seat surface, and abutted against a side surface of the cutting insert; and a first recessed part disposed above the first through hole and formed on the first restricting side surface so as to extend from the restricting seat surface toward the upper shoulder top surface. A rotary tool is constructed and arranged to detachably mount the cutting insert with the sheet member interposed therebetween. A cutting method uses the rotary tool.

19 Claims, 7 Drawing Sheets

U.S. PATENT DOCUMENTS

| | | | |
|---|---|---|---|
| 5,163,788 A * | 11/1992 | Dahl et al. | 407/46 |
| 6,942,432 B2 * | 9/2005 | Noggle et al. | 407/40 |
| 7,163,360 B2 * | 1/2007 | Toyose | 407/36 |
| 7,794,182 B2 * | 9/2010 | Lehto et al. | 407/35 |
| 2008/0240880 A1 * | 10/2008 | Durand | 409/131 |

FOREIGN PATENT DOCUMENTS

| | | |
|---|---|---|
| JP | 05-063705 | 8/1993 |
| JP | 2004-114259 | 4/2004 |
| JP | 2004-237382 | 8/2004 |
| JP | 2004-345081 | 12/2004 |

* cited by examiner (a)

(b)

(a)

(b)

(c)

SHEET MEMBER, ROTARY TOOL USING THE SHEET MEMBER, AND CUTTING METHOD USING THE ROTARY TOOL

CROSS-REFERENCE TO THE RELATED APPLICATIONS

This application is a national stage of international application No. PCT/JP2008/056118, filed on Mar. 28, 2008, which also claims the benefit of priority under 35 USC 119 to Japanese Patent Application No. 2007-092138, filed Mar. 30, 2007, the entire contents of which are incorporated herein by reference.

TECHNICAL FIELD

The invention relates to a sheet member used when a cutting insert is mounted in an insert pocket disposed in a rotary tool body. The invention also relates to a rotary tool using the sheet member, and a cutting method using the rotary tool.

BACKGROUND ART

As a cutting tool for machining a work material such as metal, there has heretofore been a rotary tool constructed and arranged to detachably mount a cutting insert in an insert pocket disposed in a rotary tool body with a sheet member interposed therebetween (for example, refer to Patent Document 1).

The rotary tool described in the above publication is provided with a rotary tool body, a sheet member and a cutting insert. An insert pocket for mounting the insert with the sheet member interposed therebetween is disposed on the tip outer periphery of the rotary tool body.

The sheet member is made up of a body part having a top surface, a bottom surface and a plurality of side surfaces, and an upper shoulder part projecting from one end of the top surface. Thus, the sheet member has a stepped shape.

Through holes are formed in the middle part of the upper shoulder top surface and in the middle part of the other end of the top surface, respectively. The through hole formed in the middle part of the upper shoulder top surface is used for inserting a fixing screw that fixes the sheet member to the insert pocket. The through hole formed in the middle part on the other end of the top surface is used for inserting a fixing screw that fixes the sheet member and the insert to the insert pocket.

Thus, the above rotary tool has, as a fixing member, the fixing screw for fixing the insert to the tool body with the sheet member interposed therebetween, and the fixing screw for fixing the sheet member to the tool body. These fixing screws reduce unsteadiness of the insert.

However, the fixing screw used for fixing the sheet member is formed to be located only in the upper shoulder part, and hence increasing the sheet member size is unavoidable. This will cause the problem that the range occupied by the insert pocket for mounting the sheet member becomes large in the tool body, thereby deteriorating the strength of the tool body.
Patent Document 1: Japanese Unexamined Patent Publication No. 2004-237382

SUMMARY OF THE INVENTION

An advantage of the invention is to provide a compact sheet member capable of firmly and stably fixing the cutting insert to the insert pocket, and also provide a rotary tool using the sheet member and a cutting method using the rotary tool.

The sheet member of the invention is provided with a body part comprising a top surface, a bottom surface and a side surface; and an upper shoulder part being formed so as to project from the top surface of the body part, and comprising an upper shoulder top surface and an upper shoulder side surface. The body part is provided with a restricting seat surface which is formed on the top surface, and contacting with a bottom surface of a cutting insert; a first through hole penetrating between the restricting seat surface and the bottom surface or the side surface; and a screw hole comprising a opening at the restricting seat surface. The upper shoulder part is provided with a first restricting side surface which is formed on the upper shoulder side surface which is intersected with the restricting seat surface, and contacting with a side surface of the cutting insert; and a first recessed part being located above the first through hole and formed on the first restricting side surface so as to extend from the restricting seat surface toward the upper shoulder top surface.

The rotary tool of the invention is constructed and arranged to detachably mount a cutting insert in an insert pocket located on an axial tip outer peripheral side of a rotary tool body with the above sheet member interposed therebetween.

The cutting method of the invention is a cutting method for cutting a work material by using the above rotary tool. The method includes the steps of: moving the rotary tool closer to the work material with at least one of the rotary tool and the work material rotated; cutting the work material by contacting a cutting edge of the cutting insert into contact with a surface of the work material; and moving the rotary tool away from the work material.

In accordance with the sheet member of the invention, the first through hole for inserting the fixing screw to be fixed to the insert pocket is formed in the body of the sheet member, and the first through hole is disposed below the first recessed part. Thereby, the first through hole and the first recessed part cooperate to constitute the fixing part for the fixing screw, thus reducing the size of the sheet member.

BEST MODE FOR CARRYING OUT THE INVENTION

Figure 1:
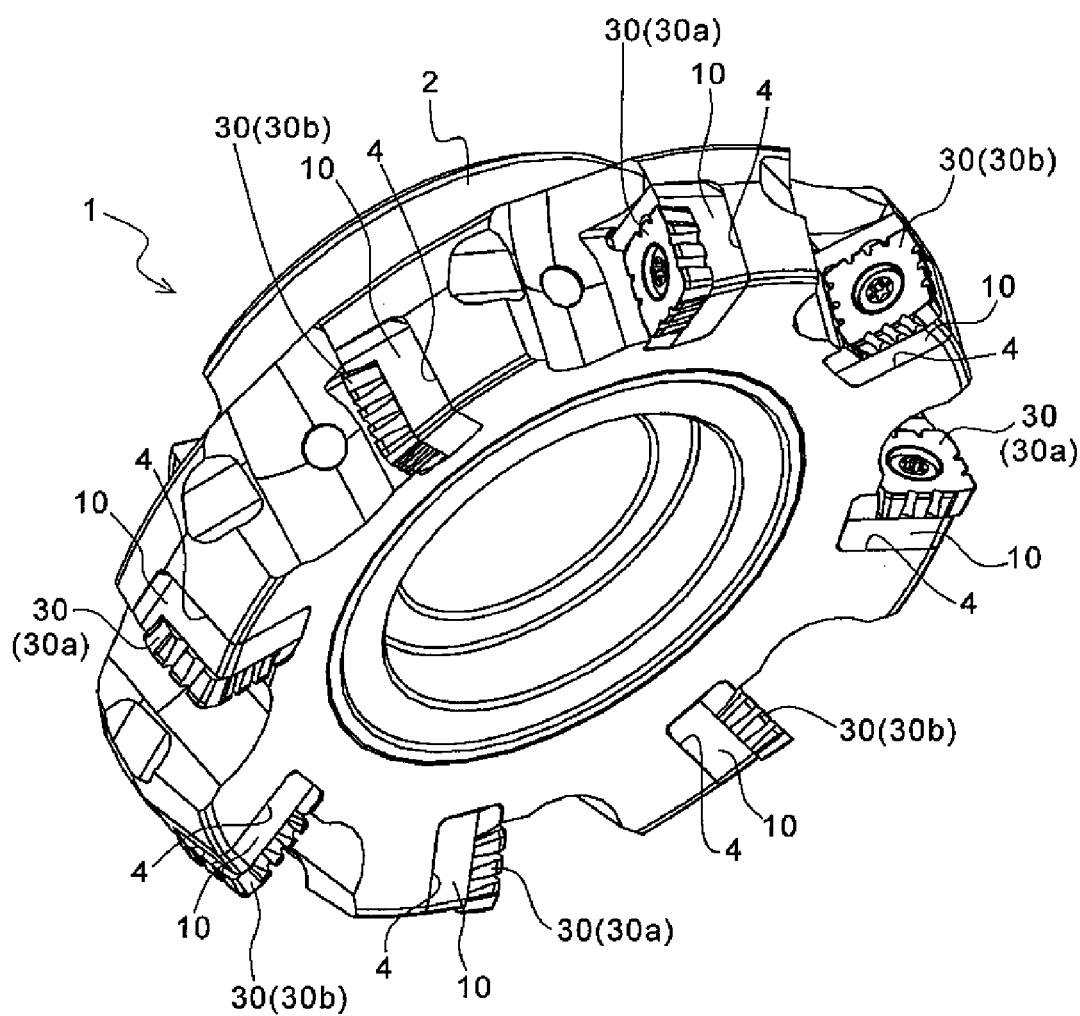
FIG. 1 is a perspective view showing a rotary tool according to a preferred embodiment of the invention.
Figure 2:
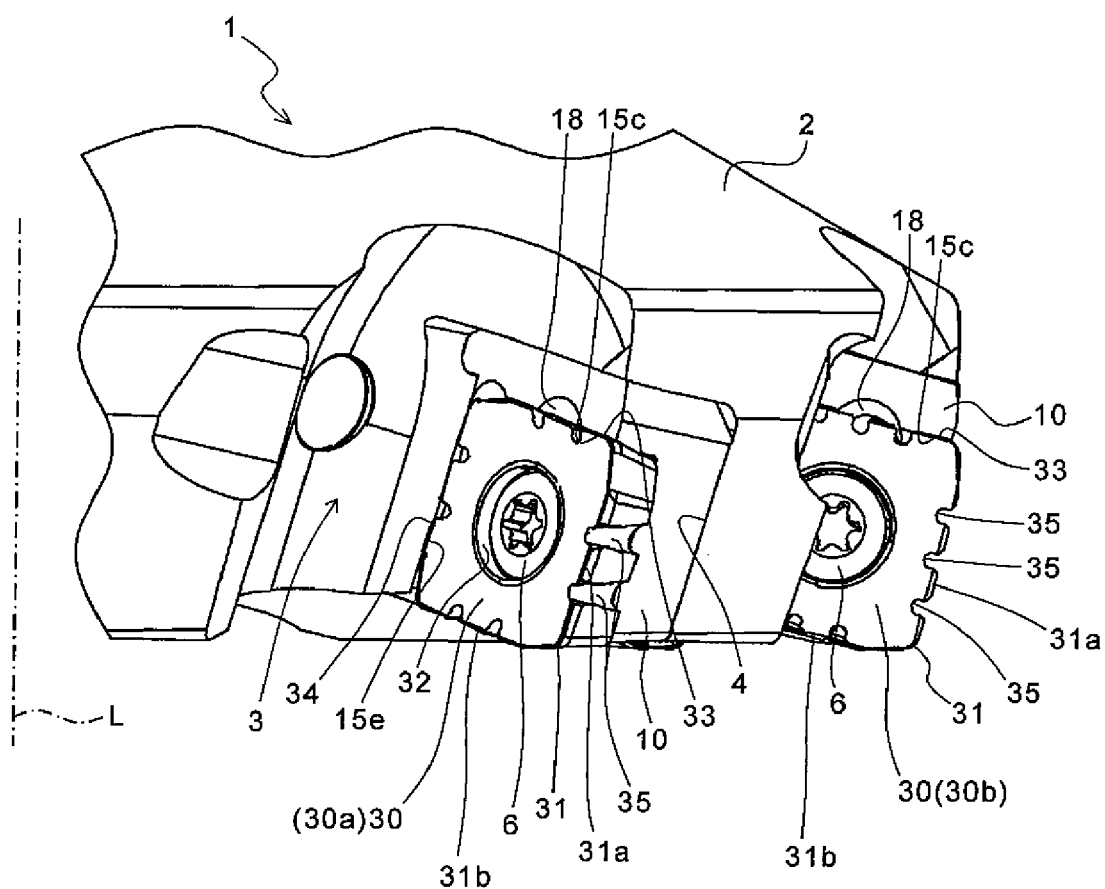
FIG. 2 is an enlarged perspective view showing the rotary tool of the preferred embodiment of the invention.

A preferred embodiment of each of the sheet member and the rotary tool of the invention will be described in detail with reference to FIGS. 1 to 5(d). As shown in FIGS. 1 and 2, the rotary tool 1 according to the present preferred embodiment is provided with a rotary tool body 2 (hereinafter referred to as the tool body 2), a sheet member 10, and a cutting insert 30 (hereinafter referred to as the insert 30).

Figure 3:
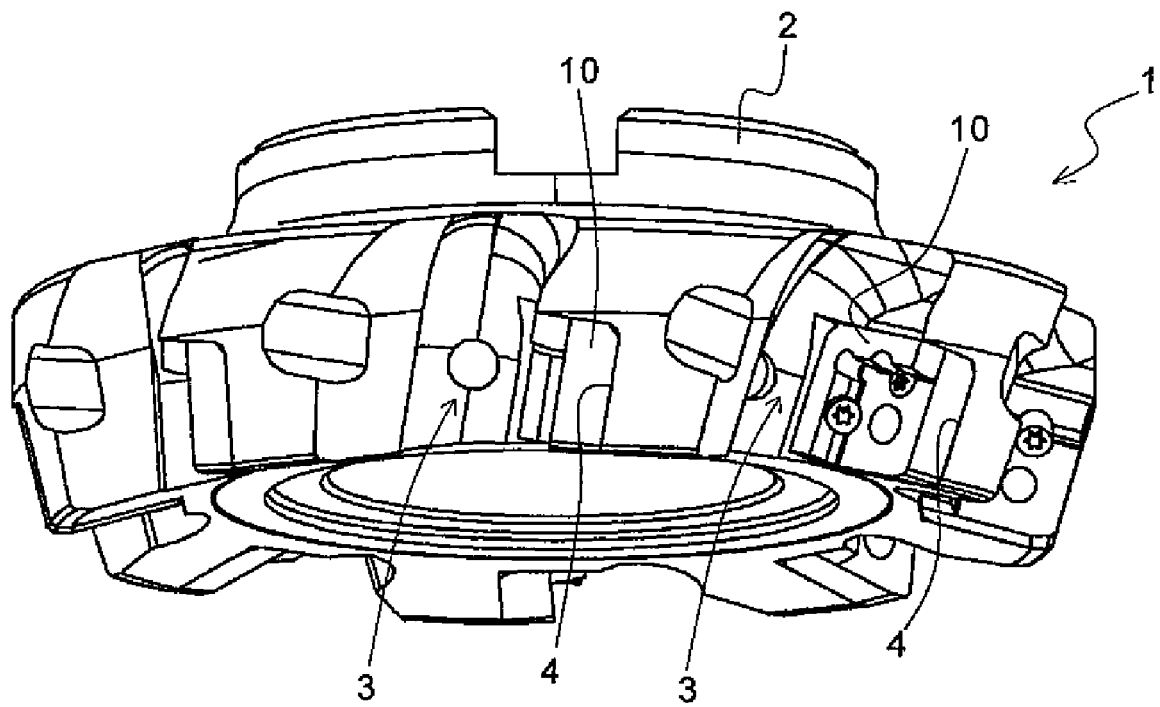
FIG. 3 is a perspective view showing the state in which a sheet member is mounted in an insert pocket according to the preferred embodiment.

In the tool body 2, a plurality of chip pockets 3 are spaced a predetermined circumferential distance from each other on the axial tip outer peripheral side thereof, as shown in FIG. 3. In each of these chip pockets 3, an insert pocket 4 for mounting the insert 30 with the sheet member 10 interposed therebetween is disposed on the upper stream side in the direction of rotation.

The sheet member 10 is disposed between the insert 30 and the insert pocket 4 in order to reduce damage to the insert pocket 4 due to chipping of the insert 30 and the like. The sheet member 10 is composed of a hard material such as cemented carbide and quenched steel. As shown in FIG. 4 and FIGS. 5(a) to 5(d), the sheet member 10 has a body part 14 having a top surface 11, a bottom surface 12 and a plurality of side surfaces 13, and an upper shoulder part 15 formed so as to project from the top surface of the body part 14.

The body part 14 is provided with a restricting seat surface 19, a first through hole 16 and a screw hole 17. The restricting seat surface 19 is formed on the top surface 11, specifically in the region of the top surface 11 except for the upper shoulder part 15. The restricting seat surface 19 is the surface which is come into contact with the bottom surface of the insert 30.

The first through hole 16 extends between the restricting seat surface 19 and the bottom surface 12. The first through hole 16 is used for inserting the first fixing screw 5 that fixes the sheet member 10 to the insert pocket 4. The axis of the first through hole 16 is substantially perpendicular to the restricting seat surface 19. The first through hole 16 thus arranged has high hole position accuracy.

The screw hole 17 opens into the restricting seat surface 19 (namely has a screw hole opening). The screw hole 17 is used for screwing the insert fixing screw 6 that fixes the insert 30 to the sheet member 10. That is, in the present preferred embodiment, the insert 30 is screwed to the sheet member 10 by screwing the fixing screw 6 to the screw hole 17. As the insert fixing screw 6, a relatively short one having a length corresponding to the thickness of the insert 30 and the threaded portion can be employed. Therefore, the fixing screw 6 fixing the insert 30 is unsusceptible to deflection during cutting, to thereby reduce lifting of the insert 30. The relatively short screw also has high position accuracy and thus also improves machining accuracy.

The screw hole 17 is formed to extend from the restricting seat surface 19 to the bottom surface 12. This improves chip discharge performance when machining the screw hole 17. Hence, the machining of the screw hole 17 is facilitated, and the machining efficiency of the sheet member 10 is improved, thereby decreasing the machining cost of the sheet member 10. The shape of the screw hole 17 is not limited to the above shape, and it may be a blind hole that does not pierce the bottom surface 12 as long as it opens into the restricting seat surface 19. In this case, the strength of the sheet member 10 can be improved.

Figure 4:
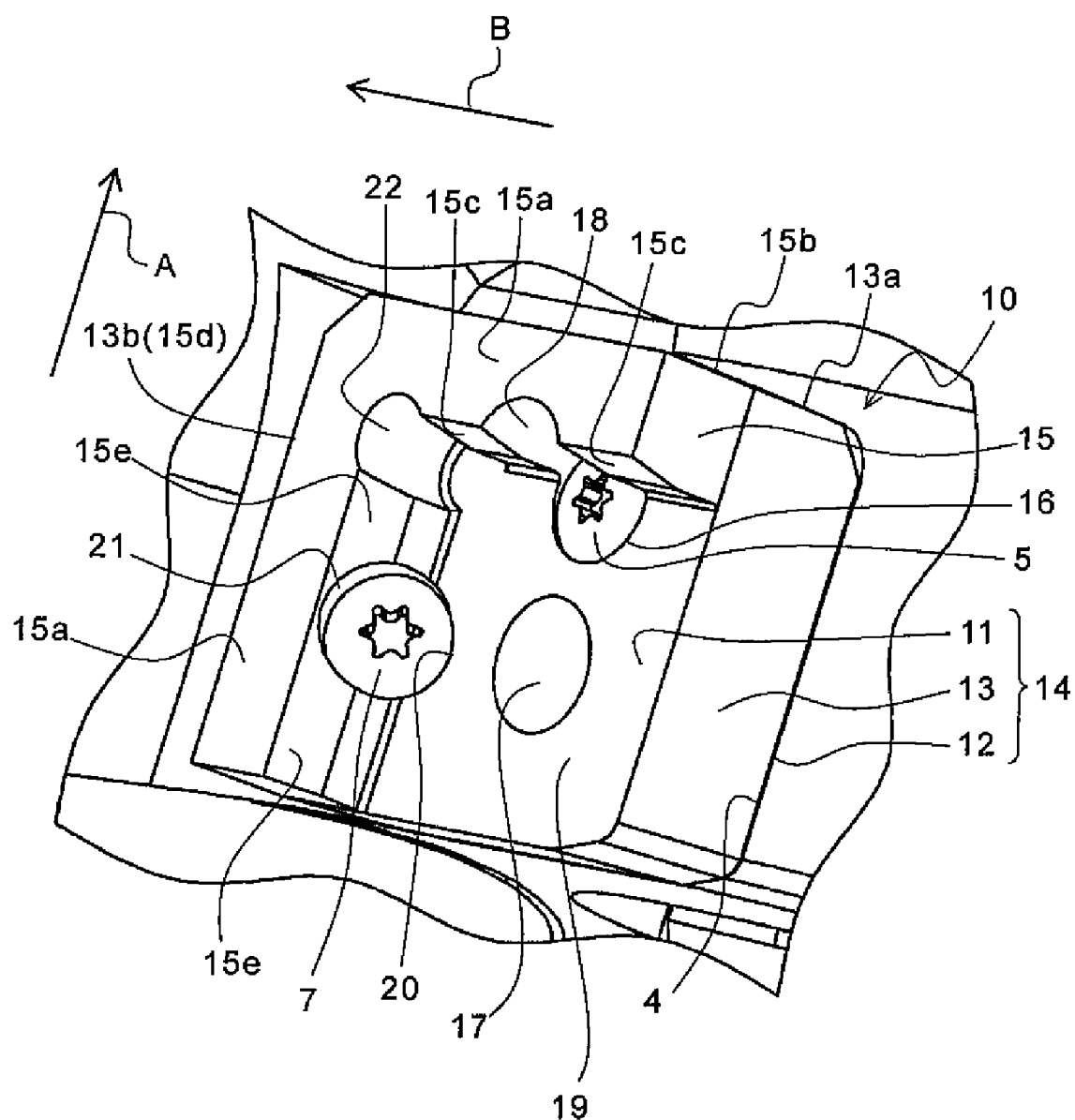
FIG. 4 is an enlarged view of FIG. 3.
Figure 5:
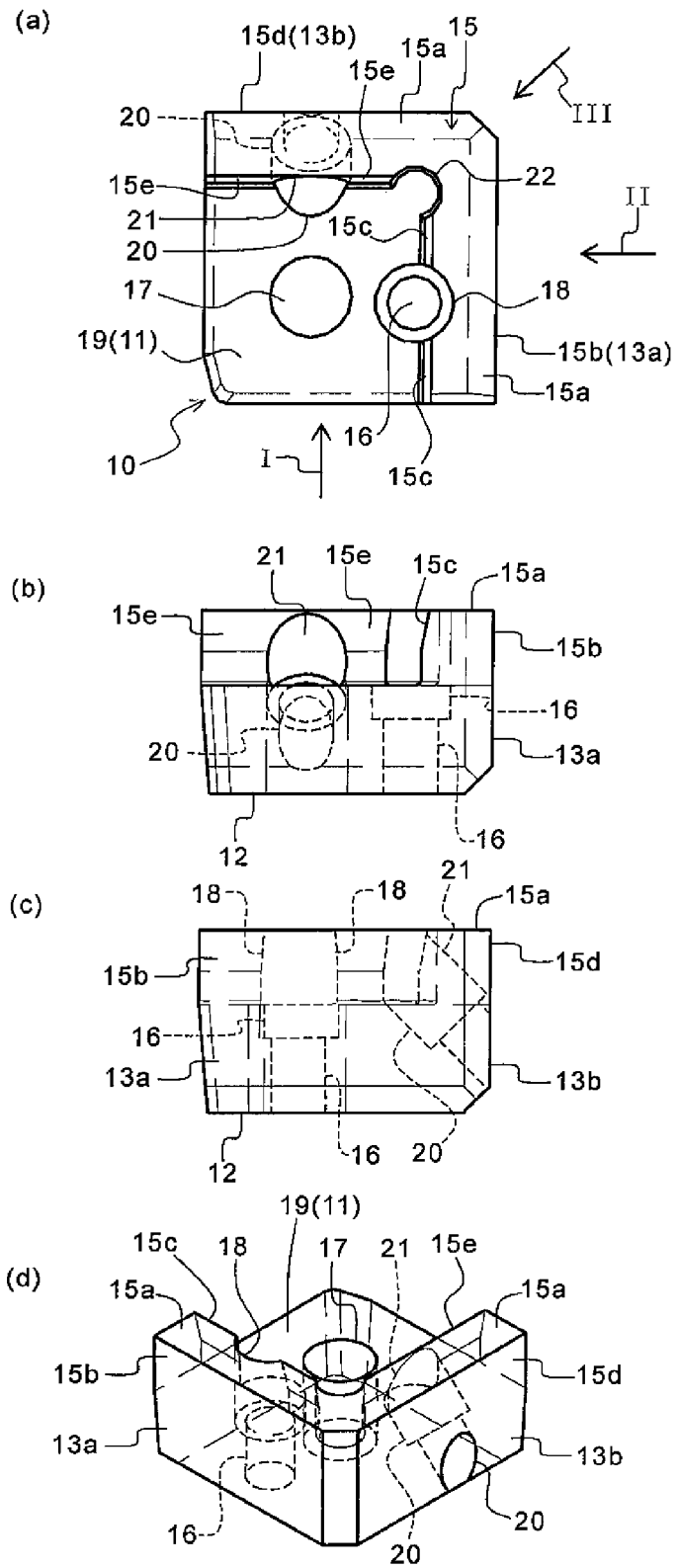
FIG. 5(a) is a plan view showing the sheet member according to the preferred embodiment of the invention.
FIG. 5(b) is a side view when the sheet member shown in FIG. 5(a) is viewed from the side indicated by an arrow I.
FIG. 5(c) is a side view when the sheet member shown in FIG. 5(a) is viewed from the side indicated by an arrow II.
FIG. 5(d) is a perspective view when the sheet member shown in FIG. 5(a) is viewed from the side indicated by an arrow III.

The upper shoulder part 15 is formed along one side surface 13a of the body part 14 located on the axial rear end side of the tool body 2 (the side in a direction indicated by an arrow A in FIG. 4). The upper shoulder part 15 is provided with an upper shoulder top surface 15a, a plurality of upper shoulder side surfaces, a first restricting side surface 15c and a first recessed part 18.

The first upper shoulder side surface 15b is located sidewise of the body part 14 and extends along the side surface 13a of the body part 14. The first restricting side surface 15c is formed on the upper shoulder side surface located at the back of the first upper shoulder side surface 15b. The upper shoulder side surface where the first restricting side surface 15c is formed is intersected with the restricting seat surface 19. The first recessed part 18 is formed on the first restricting side surface 15c so as to extend from the restricting seat surface 19 toward the upper shoulder top surface 15a.

The first restricting side surface 15c is the surface which is come into contact with the insert side surface 33 of the insert 30 (refer to FIG. 2). The first restricting side surface 15c is located in the upper half region of the upper shoulder side surface. The first recessed part 18 is formed by recessing, toward the first upper shoulder side surface 15b, the area extending from the restricting seat surface 19 to the upper shoulder top surface 15a. The first recessed part 18 is disposed above the first through hole 16.

That is, the first through hole 16 is disposed below the first recessed part 18. Thereby, the first through hole 16 and the first recessed part 18 cooperate to constitute a fixing part for fixing the sheet member 10 to the tool body 2. Accordingly, the sheet member 10 can be fixed to the tool body 2 at a location near the cutting edge position subjected to larger cutting power. Thus, the through hole constituting the fixing part can be formed in the restricting seat surface 19 instead of the upper shoulder top surface 15a. Namely, at least one piece of the fixing part can be formed in the restricting seat surface 19. This permits a compact sheet member thereby to decrease the range of the insert pocket 4 mounting the sheet member 10 in the tool body 2, thus improving the strength of the tool body 2.

When the side surface of the insert 30 is swelled into a convex form due to deformation during burning, the first recessed part 18 also functions as a so-called insert escape groove for avoiding contact of a convex form portion with the first restricting side surface 15c. That is, even if the side surface shape of the insert 30 is swelled into the convex form due to deformation during burning, the contact with the convex form portion can be reduced by the first recessed part 18. Therefore, the insert 30 can be stably abutted and restricted against the first restricting side surface 15c, without causing unsteadiness. The position of the first recessed part 18 is near the cutting edge position subjected to force during cutting, thereby reducing the lifting of the sheet member 10.

Features of the first recessed part 18 are summarized as follows. The first recessed part 18 has both of the function as a part of the fixing part for the first fixing screw 5, and the function as the insert escape groove. Therefore, the sheet member 10 realizes a compact sheet member which produces the above effects and also has the function as the insert escape groove.

On the other hand, the upper shoulder part 15 is formed along the side surface 13a, and the first upper shoulder side surface 15b is formed to extend along the side surface 13a. That is, the first upper shoulder side surface 15b is formed to be located on the same surface as the side surface 13a. This increases the surface which is come into contact with the tool body 2, namely, enlarges the abutting surface between the sheet member 10 and the insert pocket 4. Therefore, the sheet member 10 can be stably fixed to the tool body 2, so that the insert 30 can be firmly fixed to the tool body 2 with the sheet member 10 interposed therebetween.

The fact that the first upper shoulder side surface 15b and the side surface 13a are on the same surface means that the first upper shoulder part 15b and the side surface 13a are formed on substantially the same surface. The same effect as above is obtainable even if at least one of these two surfaces is a surface having a step level error due to grinding or the like.

The first recessed part 18 is continuous with at least a part of the inner wall surface of the first through hole 16. This facilitates the machining of the sheet member 10, and also improves the strength of the connection part between the first recessed part 18 and the first through hole 16.

The first recessed part 18 has an arc shape when viewed from above, and the radius of the arc of the first recessed part 18 is equal to the radius of the first through hole 16. This enables the first recessed part 18 and the first through hole 16 to be machined by, for example, a ball end mill or the like. As a result, the machining of the sheet member is further facilitated to permit a further decrease of the machining cost.

Here, the arc shape may be substantially an arc shape. That is, the shape of the first recessed part 18 as viewed from above may be a curved shape. For example, as viewed from above, the radius of the first recessed part 18 can be set to one-half of the distance between two junctions of a virtual extension of the first restricting side surface 15c and the first recessed part 18.

The first recessed part 18 is located at a substantially middle part of the first restricting side surface 15c. This permits a well-balanced distribution of the force exerted onto the first restricting side surface 15c during cutting, into both ends of the side surface thereof. Further, when the substantially middle part of the side surface of the insert 30 is swelled into a convex form due to deformation during burning, it is capable of reducing the event that the convex form portion contacts and interferes with the first restricting side surface 15c, thereby to stably fix the insert 30.

The term "the substantially middle part of the first restricting side surface 15c" means substantially the center of the dimension of the first restricting side surface 15c in a direction indicated by an arrow I shown in FIG. 5(a). That is, the first recessed part 18 is located substantially at the center of the dimension of the first restricting side surface 15c in the direction indicated by the arrow I. Since the first recessed part 18 is formed so as to intersect with the upper shoulder top surface 15a, the first restricting side surface 15c is divided into two by the first recessed part 18. These two restricting side surfaces 15c divided by the first recessed part 18 have the same dimension in the direction indicated by the arrow I.

On the other hand, the upper shoulder part 15 is located radially inside the tool body 2 (on the side in a direction indicated by an arrow B in FIG. 4), and also formed to extend along the other side surface 13b intersecting with the side surface 13a. The upper shoulder part 15 is provided with a second upper shoulder side surface 15d extending along the other side surface 13b, and a second restricting side surface 15e formed on the upper shoulder side surface located at the back of the second upper shoulder side surface 15d. Thereby, the insert 30 can also become into contact with and restriction against the second restricting side surface 15e in addition to the first restricting side surface 15c, thereby to more stably fix the insert 30.

The second restricting side surface 15e is the surface which is come into contact with an insert side surface 34 of the insert 30 (refer to FIG. 2). The second restricting side surface 15e is located in the upper half region of the upper shoulder side surface.

The upper shoulder part 15 has a corner recessed part 22 formed to extend from the restricting seat surface 19 to the upper shoulder top surface 15a in the intersection between the first restricting side surface 15c and the second restricting side surface 15e. Thus, the corner part of the insert 30 can be accommodated in the corner recessed part 22.

The second upper shoulder side surface 15d is formed to extend along the side surface 13b. Specifically, the second upper shoulder side surface 15d is formed to be located on the same surface as the side surface 13b. Consequently, the sheet member 10 can be firmly fixed to the tool body 2, as in the case of the first shoulder side surface 15 as described above.

The body part 14 further has, besides the first through hole 16, an inclined through hole 20 (a second through hole) extending between the restricting seat surface 19 and the side surface 13b. The inclined through hole 20 is used for inserting a second fixing screw 7 that fixes the sheet member 10 to the insert pocket 4. The inclined through hole 20 is formed inclined to the second restricting side surface 15e, specifically inclined sideward of the body part 14 from the restricting seat surface 19 toward the bottom surface 12. The inclined through hole 20 opens into the side surface 13b. Thereby, the first through hole 16 and the inclined through hole 20 can be arranged at positions being further apart from each other, thereby further firmly fixing the sheet member 10 to the insert pocket 4.

The screw hole 17 is at substantially the same distance from the first through hole 16 and from the inclined through hole 20. Therefore, the insert 30 can be fixed from the balanced directions with respect to the force exerted during cutting, thereby to stably fix the insert 30. This enhances the effect of reducing the lifting of the insert 30. Additionally, owing to the inclined through hole 20 thus inclined, the second fixing screw 7 can be easily inserted even if the wall surface of the chip pocket 3 is formed to cover above the inclined through hole 20. That is, the strength of the tool body 2 can be improved by forming the wall surface of the chip pocket 3 so as to cover above the inclined through hole 2.

An inclined recessed part 21 (a second recessed part) is formed on the second restricting side surface 15e. This facilitates insertion of the second fixing screw 7 into the inclined through hole 20.

The inclined recessed part 21 is formed on the second restricting side surface 15e so as to extend from the restricting seat surface 19 toward the upper shoulder top surface 15a, and also extend above the second restricting side surface 15e. The inclined recessed part 21 is formed inclined to the second restricting side surface 15e, specifically recessed and inclined toward the second upper shoulder side surface 15d from above the second restricting side surface 15e toward the restricting seat surface 19.

Unlike the first recessed part 18, the inclined recessed part 21 does not intersect with the upper shoulder top surface 15a, but is capable of reducing the event that the side surface of the insert 30 adjacent to the bottom surface is brought into contact and interference with the second restricting side surface 15e. That is, the inclined recessed part 21 also functions as an escape groove.

The inclined recessed part 21 is disposed above the inclined through hole 20. That is, the inclined through hole 20 is disposed below the inclined recessed part 21. This enables the inclined through hole 20 to be disposed at a position further apart from the first through hole 16, thereby improving the force by which the sheet member 10 is fixed to the insert pocket 4. Even if a part of the tool body 2 is formed to cover the insert pocket 4, the second fixing screw 7 can be easily inserted into the inclined through hole 20, thus improving working efficiency.

The inclined recessed part 21 is continuous with at least a part of the inner wall surface of the inclined through hole 20. This facilitates the machining of the sheet member 10, and also improves the strength of the connection part between the inclined recessed part 21 and the inclined through hole 20.

The inclined recessed part 20 is also formed to be located on the same surface as a part of the inner wall surface of the inclined through hole 21, and hence they can be machined by an end mill, thus decreasing the machining cost of the sheet member 10.

The inclined recessed part 21 is located at a substantially middle part of the second restricting side surface 15e. This permits a well-balanced distribution of the force exerted onto the second restricting side surface 15e during cutting, into both ends of the side surface thereof. Further, both ends of the insert side surface 34 of the insert 30 abut against the second restricting side surface 15e, so that the insert 30 can be stably fixed by the sheet member 10.

Here, the substantially middle part of the second restricting side surface 15e can be defined similarly to the substantially center of the first restricting side surface 15c described above. That is, it means substantially the center in the dimension of the second restricting side surface 15e in a direction indicated by an arrow II in FIG. 5(a).

On the other hand, the insert 30 has a cutting edge 31 at the intersection between the top surface and the side surface as shown in FIG. 2, and a through hole 32 is formed at the middle part in the top surface. The through hole 32 is used for inserting the insert fixing screw 6 described above.

In the individual side surfaces of the insert 30, two groove parts 35 (nicks) for dividing the cutting edge 31 are formed from the side surface to the top surface in an insert 30a, and three groove parts 35 are formed similarly in an insert 30b. Therefore, when cutting (machining) is carried out by the insert 30, portions of a work material which are located at positions corresponding to these groove parts 35 are not cut, and cutting force can be decreased by the amount of these non-cut parts. Hence, the insert 30 is usable mainly for the purposes of decreasing cutting force in heavy cutting and improving biting performance onto a work material.

When machining is carried out by using the insert 30 alone, portions of a work material which are located at positions corresponding to the groove parts 35 are not subjected to cutting, so that a belt-like non-cut part remains on the machined wall surface of the work material. Therefore, in the rotary tool using the inserts 30, the inserts 30a and 30b having different arrangements of the groove parts 35 are alternately mounted in the individual insert pockets 4 so that the remaining non-cut part caused by one insert can be cut by the other insert (refer to FIG. 1). The structure of the insert 30 is not limited to that described above. For example, the groove parts 35 may not be formed in the side surface. The shape and the number of groove parts formed are also not limited to those described above.

The rotary tool 1 provided with the tool body 2, the sheet members 10 and the inserts 30 is constructed and arranged to detachably mount the inserts 30 in a plurality of insert pockets 4 disposed in the tool body 2, by interposing therebetween the sheet members 10, respectively. That is, firstly, the first fixing screw 5 is inserted into the first through hole 16 of the sheet member 10, and the second fixing screw 7 is inserted into the inclined through hole 20. Subsequently, each of the sheet members 10 is detachably mounted in each of the insert pockets 4 by screwing the tip ends of the first fixing screw 5 and the second fixing screw 7 to screw holes (not shown) formed in the seat surfaces of these insert pockets 4.

Each of the sheet members 10 mounted in the insert pockets 4 is fixed to the tool body 2 so as to abut against three surfaces. That is, the sheet member 10 is fixed so that the bottom surface 12, the surface constituted by the first upper shoulder side surface 15b and the side surface 13a, and the surface constituted by the second upper shoulder side surface 15d and the side surface 13b abut against the tool body 2. Thereby, the sheet member 10 can be restricted within the tool body 2 by the surface opposed to a direction in which cutting power is applied. Consequently, the sheet member 10 can be firmly and stably fixed to the tool body 2.

The sheet members 10 mounted in the insert pockets 4 are arranged as shown in FIG. 2. The first restricting side surface 15c is disposed substantially perpendicular to an axial line L direction of the tool body 2. The second restricting side surface 15e is disposed substantially parallel to the axial line L direction of the tool body 2. As described earlier, the inclined recessed part 21 and the inclined through hole 20 are formed inclined to the second restricting side surface 15e. Therefore, a fixing force is obliquely radially inwardly (toward the axial line L) onto the fixing part constituted by the inclined recessed part 21, the inclined through hole 20 and the second fixing screw 7. Thus, the surface constituted by the upper shoulder side surface 15d and the side surface 13b can be firmly fixed to the tool body 2, thereby stabilizing the fixed state of the second restricting side surface 15e.

After each of the sheet members 10 is mounted in the insert pocket 4, the insert 30 is mounted on the top surface 11 of the sheet member 10 so that the position of the through hole 32 of the insert 30 and the position of the screw hole 17 of the sheet member 10 coincide with each other. The insert 30 is then fixed to the sheet member 10 by inserting the insert fixing screw 6 into the through hole 32, and screwing the tip end of the insert fixing screw 6 to the screw hole 17. Thus, the insert 30 is detachably mounted in the insert pocket 4 with the sheet member 10 interposed therebetween.

As shown in FIG. 2, the mounted insert 30 is then fixed so that the insert side surface 33 on the axial rear end side of the tool body 2 is come into contact with the first restricting side surface 15c of the sheet member 10, and the insert side surface 34 of radially inside the tool body 2 is abutted against the second restricting side surface 15e of the sheet member 10.

Particularly, the insert side surface 34 abutted against the second restricting side surface 15e having a stable fixed state is more firmly and stably fixed. This stabilizes the fixed state of the outer peripheral cutting edge 31a opposed to the insert side surface 34, and also improves the position accuracy of the outer peripheral cutting edge 31a between the individual inserts 30.

Next, other preferred embodiment of the invention will be described in detail with reference to FIGS. 6(a) and 6(b). In FIGS. 6(a) and 6(b), the same components as those in FIGS. 1 to 5(d) have the same reference numbers, and their descriptions are omitted.

A sheet member 40 shown in FIG. 6(a) has a second through hole 41 extending between a restricting seat surface 19 and a bottom surface 12. The second through hole 41 is used for inserting a fixing screw that fixes the sheet member 40 to an insert pocket 4, so that the sheet member 40 can be more firmly fixed to the insert pocket 4.

The second through hole 41 is disposed below a later-described second recessed part 42 of an upper shoulder part 15. Thereby, a second restricting side surface 15e can produce the same effect as the first restricting side surface 15c described earlier. Additionally, a compact sheet member can be achieved by sharing the second through hole 41 and the second recessed part 42.

The second recessed part 42 extending from the restricting seat surface 19 toward an upper shoulder top surface 15a is formed on the second restricting side surface 15e of the upper shoulder 15. The second recessed part 42 is formed by recessing, toward the second upper shoulder side surface 15d, the area extending from the restricting seat surface 19 to the upper shoulder top surface 15a. That is, the second recessed part 42 intersects with the upper shoulder top surface 15a. Like the first recessed part 18, the second recessed part 42 functions as a fixing part for a fixing screw that fixes the sheet member 10 to the tool body 2, and also as an insert escape groove.

The sheet member 40 having a plurality of recessed parts functioning as the insert escape groove, as in the present preferred embodiment, is suitable for mounting an insert having a plurality of cutting edges, such as so-called 2 edge design insert and 3 edge design insert.

That is, in the sheet member 40, the axial lines of the first and the second through holes are substantially perpendicular to the restricting seat surface 19, and hence the first and the second through holes have high position accuracy. Thus, the sheet member 40 can be accurately fixed to the tool body 2, thereby to improve machining accuracy. Otherwise, the structure is identical to that described in the foregoing preferred embodiment, and the description thereof is omitted.

Figure 6:
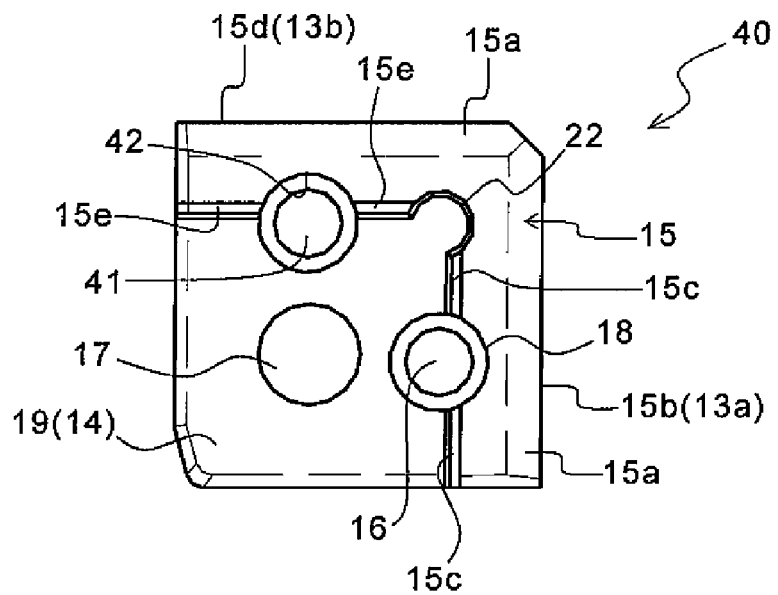
FIGS. 6(a) and 6(b) are plan views showing a sheet member according to other preferred embodiment of the invention.
Figure 6:
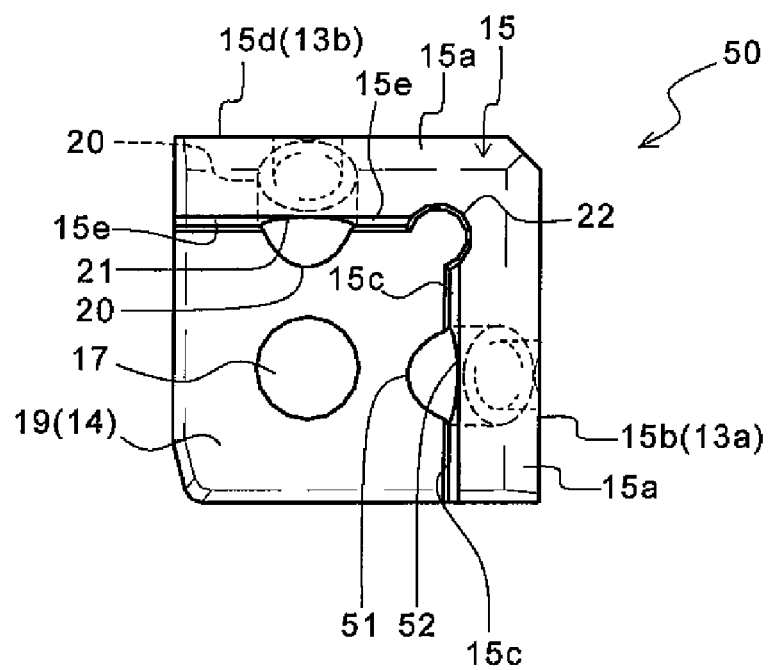

A sheet member 50 shown in FIG. 6(*b*) has an inclined through hole 51 (a first through hole) extending between a restricting seat surface 19 and a side surface 13*a*. The inclined through hole 51 is formed inclined to a first restricting side surface 15*c*, specifically inclined sidewardly of a body part 14 from the restricting seat surface 19 toward a bottom surface 12. The inclined through hole 51 opens into the side surface 13*a*.

An inclined recessed part 52 (a first recessed part) is formed on the first restricting side surface 15*c*. The inclined recessed part 52 extends from the restricting seat surface 19 toward an upper shoulder top surface 15*a* on the first restricting side surface 15*c*, and also extends above the first restricting side surface 15*c*.

The inclined recessed part 52 is formed inclined to the first restricting side surface 15*c*, specifically recessed and inclined toward the first upper shoulder side surface 15*b* from above the first restricting side surface 15*c* toward the restricting seat surface 19. The inclined recessed part 52 is disposed above the inclined through hole 51.

That is, in the sheet member 50, the first and the second through holes are inclined through holes, and the first and the second recessed parts are inclined recessed parts. When the sheet member 50 is mounted in the insert pocket 4, and the first restricting side surface 15*c* is set substantially perpendicular to an axial line L direction of the tool body 2, a fixing force is exerted obliquely axially rearwardly onto the fixing part constituted by the inclined recessed part 52, the inclined through hole 51 and the first fixing screw 5 (refer to FIG. 2). Thus, the surface constituted by the first upper shoulder side surface 15*b* and the side surface 13*a* can be firmly fixed to the tool body 2, thereby stabilizing the fixed state of the first restricting side surface 15*c*.

An insert side surface 33 abutted against the first restricting side surface 15*c* having a stable fixed state is more firmly and stably fixed. This stabilizes the fixed state of a tip end cutting edge 31*b* opposed to the insert side surface 33, and also improves the position accuracy of the tip end cutting edge 31*b* between the individual inserts 30.

As described above, the fixed state of the outer peripheral cutting edge 31*a* is stabilized owing to the fixing part constituted by the inclined recessed part 21, the inclined through hole 20 and the second fixing screw 7, onto which the fixing force is exerted obliquely radially inwardly, and the position accuracy of the outer peripheral cutting edge 31*a* between the individual inserts 30 is also improved. Hence, the sheet member 50 particularly improves the machining accuracy of a work material. Otherwise, the structure is identical to that described in the foregoing preferred embodiment.

Figure 7:
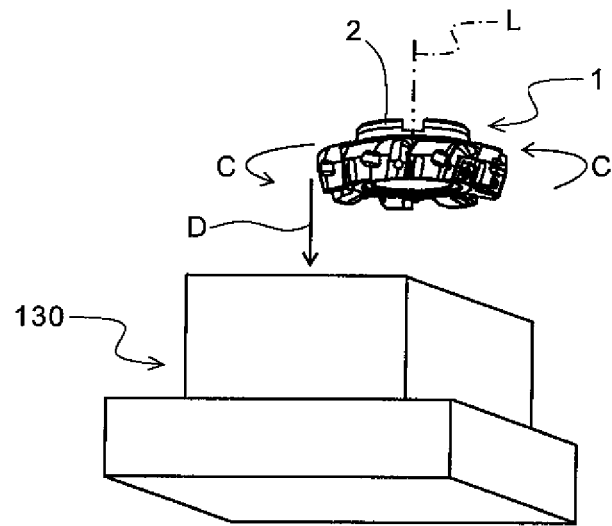
FIGS. 7(a) to 7(c) are schematic diagrams showing a cutting method according to a preferred embodiment of the invention.
Figure 7:
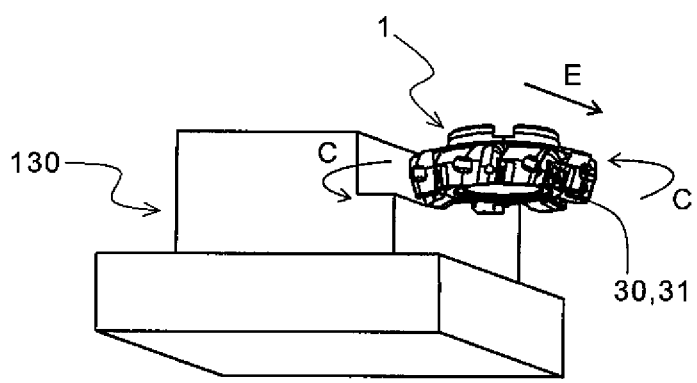
Figure 7:
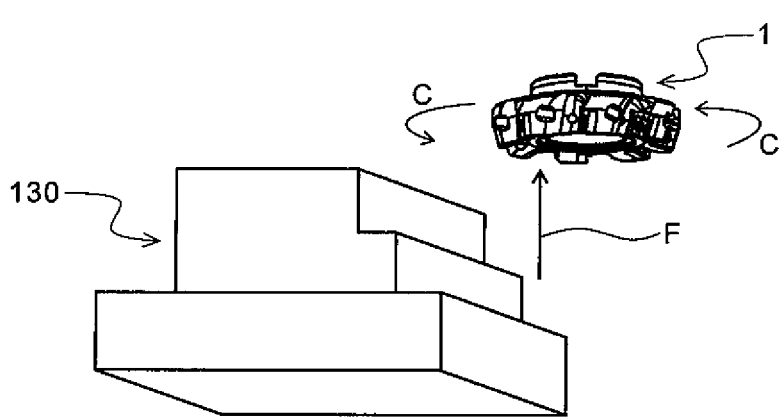

Next, a cutting method of cutting a work material by using the rotary tool 1 will be described in detail with reference to FIGS. 7(*a*) to 7(*c*). The cutting method includes the following steps (i) to (iii):

(i) as shown in FIG. 7(*a*), the step of rotating the rotary tool 1 around the axis L of the tool body 2 in a direction indicated by an arrow C, and bringing the rotary tool 1 near a work material 130 in a directions indicated by an arrow D;

(ii) as shown in FIG. 7(*b*), the step of cutting the work material 130 by bringing the cutting edge 31 of the insert 30 into contact with the surface of the work material 130, and moving it in a direction indicated by an arrow E; and (iii) as shown in FIG. 7(*c*), the step of keeping the rotary tool 1 away from the work material 130 by moving the rotary tool 1 in a direction indicated by an arrow F.

As described earlier, the rotary tool 1 is constructed and arranged by mounting the insert 30 in the insert pocket 4 with the sheet member 10 interposed therebetween. Accordingly, the sheet member 10 is press fixed to the tool body at a position near the cutting edge 31 of the insert 30. Hence, the sheet member 10 is unsusceptible to shift even if large cutting power is applied to the cutting edge 31 in the above step (ii). Since the insert 30 is screwed by the insert fixing screw 6 having a relatively short length corresponding to the thickness of the insert 30 and the threaded portion, the insert fixing screw is unsusceptible to deflection during cutting, thereby preventing the insert 30 from lifting. This ensures a well-finished surface even for work materials having more severe cutting conditions and high degree of difficulty.

In the above step (i), at least one of the rotary tool 1 and the work material 130 may be rotated. The rotary tool 1 and the work material 130 may be relatively close to each other. For example, the work material 130 may be brought near the rotary tool 1. Similarly, in the above step (iii), the work material 130 and the rotary tool 1 may be relatively away from each other. For example, the work material 130 may be moved away from the rotary tool 1. When cutting is continued, the step of bringing the cutting edge 31 of the insert 30 into contact with different points of the work material 130 may be repeated, keeping the rotary tool 1 and/or the work material 130 rotating.

While the several preferred embodiments of the invention have been described and illustrated above, it is to be understood that the invention is not limited to these preferred embodiments and applicable to those in which changes and improvements are made thereto without departing from the spirit or scope of the invention.

For example, in the sheet members 10, 40 and 50, the first through hole and the first recessed part as well as the second through hole and second recessed part have the continuous wall surfaces, respectively. Alternatively, the first recessed part and the second recessed part may not be continuous with the wall surface of their respective corresponding through holes. For example, when viewed from above, the cross-sectional shapes of the first recessed part and the second recessed part may not be overlapped with a part of the cross-sectional shape of the corresponding through hole. That is, the first recessed part and the second recessed part are formed so that the fixing screw can be inserted from above into the corresponding through hole.

Although in these sheet member 10, 40 and 50, the two fixing parts for fixing each of these sheet members to the tool body, at least one fixing part may be formed. When a plurality of fixing parts are disposed, as described earlier, they are preferably spaced from each other in order to exhibit strong fixing force. The fixing force can be improved by symmetrically arranging the plurality of the fixing parts with respect to the fixing parts for fixing the insert to the tool body.

In the sheet member 10, the upper shoulder part 15 has the second upper shoulder side surface 15*d* and the second restricting side surface 15*e* which extend along the side surface 13b. Alternatively, the upper shoulder part 15 may not have them, and only the inclined through hole 21 may be disposed at a predetermined position.

Although the first upper shoulder side surface 15b is formed to be located on the same surface as the side surface 13a, a predetermined space for interposing a so-called spacer may be formed above the top surface 11 located between the side surface 13a and the first upper shoulder side surface 15b by shifting the upper shoulder part 15 toward the axial tip end of the tool body 2 (toward the reverse direction of the direction indicated by the arrow A in FIG. 4). The spacer thus interposed improves the position accuracy of the tip end cutting edge 31b. Alternatively, the upper shoulder part 15 may be shifted reversely, namely toward the axial rear end of the tool body 2 (toward the direction indicated by the arrow A in FIG. 4). In this case, the upper shoulder part 15 is located most outward of the sheet member 10. Therefore, the position accuracy can be improved by bringing only the upper shoulder part into abutment against the tool body 2.

Although the second upper shoulder side surface 15d is formed to be located on the same surface as the side surface 13b, in the same manner as described in the first upper shoulder side surface 15b, a predetermined space for interposing a spacer may be formed above the top surface 11 located between the side surface 13b and the second upper shoulder side surface 15d by shifting the upper shoulder part 15 formed along the side surface 13b toward the radial outer periphery of the tool body 2 (toward the reverse direction of the direction indicated by the arrow B in FIG. 4). This improves the position accuracy of the outer peripheral cutting edge 31a.

The invention claimed is:

1. A sheet member, comprising:
   a body part comprising a top surface, a bottom surface, a side surface, and a first through hole penetrating from the top surface to the bottom surface or the side surface of the body part;
   an upper shoulder part projecting from the top surface of the body part;
   wherein the upper shoulder part comprises:
     an upper shoulder top surface,
     an upper shoulder side surface intersected with the upper shoulder top surface and the top surface;
     a first recessed part formed on the upper shoulder side surface so as to extend from the top surface toward the upper shoulder top surface
   wherein the first recessed part is located above the first through hole,
   wherein the body part comprises a second through hole penetrating from the top surface to the bottom surface or another side surface which is different from the side surface; and
   wherein the upper shoulder part further comprises a second recessed part which is located above the second through hole and is formed on the upper shoulder side surface so as to extend from the top surface toward the upper shoulder top surface.

2. The sheet member according to claim 1, wherein the top surface comprises a restricting seat surface contacting with a bottom surface of a cutting insert, and the upper shoulder side surface comprises a first restricting side surface contacting with one side surface of the cutting insert.

3. The sheet member according to claim 2, wherein the first recessed part is located at a substantially middle part of the first restricting side surface.

4. The sheet member according to claim 2, wherein a screw hole is in the restricting seat surface.

5. The sheet member according to claim 2, wherein the upper shoulder side surface is plural, and another upper shoulder side surface, which is different from the upper shoulder side surface comprising the first restricting side surface, comprises a second restricting side surface contacting with another side surface of the cutting insert which is different from the one side surface of the cutting insert.

6. The sheet member according to claim 5, wherein the upper shoulder part further comprises a corner recessed part on the intersection of the first restricting side surface and the second restricting side surface.

7. The sheet member according to claim 2, wherein an inner wall surface of the first recessed part is continuous with at least a part of an inner wall surface of the first through hole.

8. The sheet member according to claim 2, wherein the first recessed part extends to the upper shoulder top surface so as to form an arc shape when viewed from above, and the radius of the arc of the first recessed part is equal to the radius of the first through hole.

9. The sheet member according to claim 1, wherein an inner wall surface of the first recessed part is continuous with at least a part of an inner wall surface of the first through hole.

10. The sheet member according to claim 1, wherein the first recessed part extends from the upper shoulder top surface to the top surface so as to form an arc shape when viewed from above, and the radius of the arc of the first recessed part is equal to the radius of the first through hole.

11. The sheet member according to claim 1, wherein the screw hole is located at substantially the same distance from the center of the first through hole as from the center of the second through hole when viewed from above.

12. The sheet member according to claim 1, wherein an inner wall surface of the second recessed part is continuous with at least a part of an inner wall surface of the second through hole.

13. The sheet member according to claim 1, wherein the second recessed part is located at a substantially middle part of the second restricting side surface.

14. The sheet member according to claim 1, wherein the second through hole and the second recessed part are inclined to the second restricting side surface when viewed from cross-section.

15. The sheet member according to claim 1, wherein the second through hole penetrates to the other side surface.

16. The sheet member according to claim 1, wherein the second recessed part extends to the upper shoulder top surface so as to form an arc shape when viewed from above, and the radius of the arc of the second recessed part is equal to the radius of the second through hole of the body part.

17. A rotary tool, comprising:
   a rotary tool body comprising an insert pocket located on an outer peripheral side of an axial tip of the rotary tool body;
   the sheet member according to claim 1 mounted on the insert pocket; and
   a cutting insert detachably mounted on the insert pocket through the sheet member.

18. A cutting method for cutting a work material, comprising:
   rotating the rotary tool according to claim 17;
   contacting the cutting insert with the work material; and
   moving the rotary tool away from the work material.

19. A cutting method according to claim 18;
   wherein the step of contacting the cutting insert with the work is performed with the rotary tool rotated.

* * * * *